Dec. 15, 1936. J. R. SONTAGH ET AL 2,064,275
INTERMITTENT FEED MECHANISM
Filed Feb. 28, 1934 2 Sheets-Sheet 1

INVENTOR
JOHN R. SONTAGH
HAROLD C. HOLDEN
BY
ATTORNEY

Dec. 15, 1936.  J. R. SONTAGH ET AL  2,064,275
INTERMITTENT FEED MECHANISM
Filed Feb. 28, 1934   2 Sheets-Sheet 2
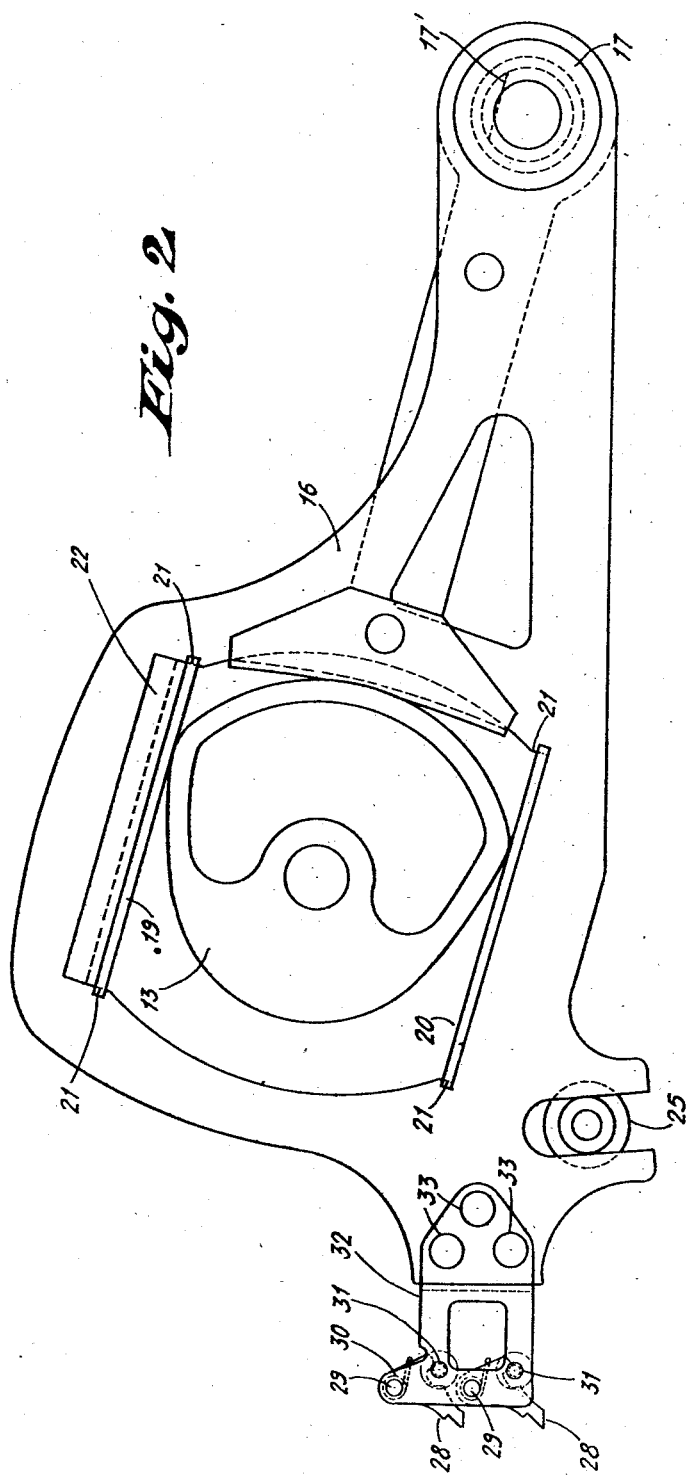
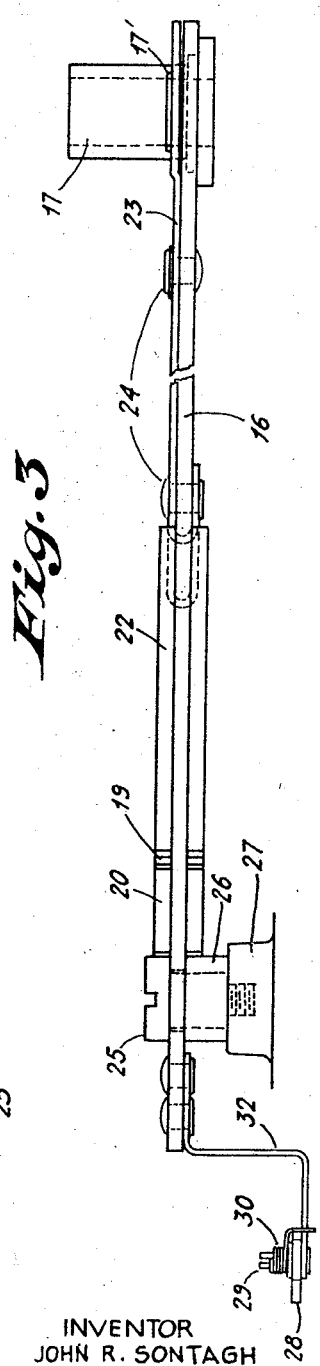
INVENTOR
JOHN R. SONTAGH
HAROLD C. HOLDEN
BY
ATTORNEY Patented Dec. 15, 1936

2,064,275

UNITED STATES PATENT OFFICE 2,064,275

INTERMITTENT FEED MECHANISM

John R. Sontagh, Audubon, and Harold C. Holden, Woodbury, N. J., assignors to Radio Corporation of America, a corporation of Delaware Application February 28, 1934, Serial No. 713,286

3 Claims. (Cl. 74—54)

The present invention relates to an intermittent feed mechanism, and more particularly to an intermittent feed mechanism of the intermittent-grip type for use in feeding the film of motion picture apparatus.

One object of our invention is to provide such an intermittent feed mechanism which is inexpensive and simple to construct.

Another object of our invention is to provide such a mechanism which is substantially noiseless.

Another object of our invention is to provide such a mechanism which does not become noisy through wear.

Another object of our invention is to provide such a mechanism with means for preventing mechanical reactions from the intermittent operation thereof affecting the constancy of speed of the driving means therefor.

Another object of our invention is to provide such a mechanism which will be efficiently and economically lubricated.

Another object of our invention is to provide such a mechanism which will automatically compensate for wear of the feed cam and the cam follower.

Other objects of our invention will be apparent from a reading of the following specification and an inspection of the accompanying drawings in which:

Fig. 2 is an elevation thereof.

Fig. 3 is a plan view thereof.

Figure 1:
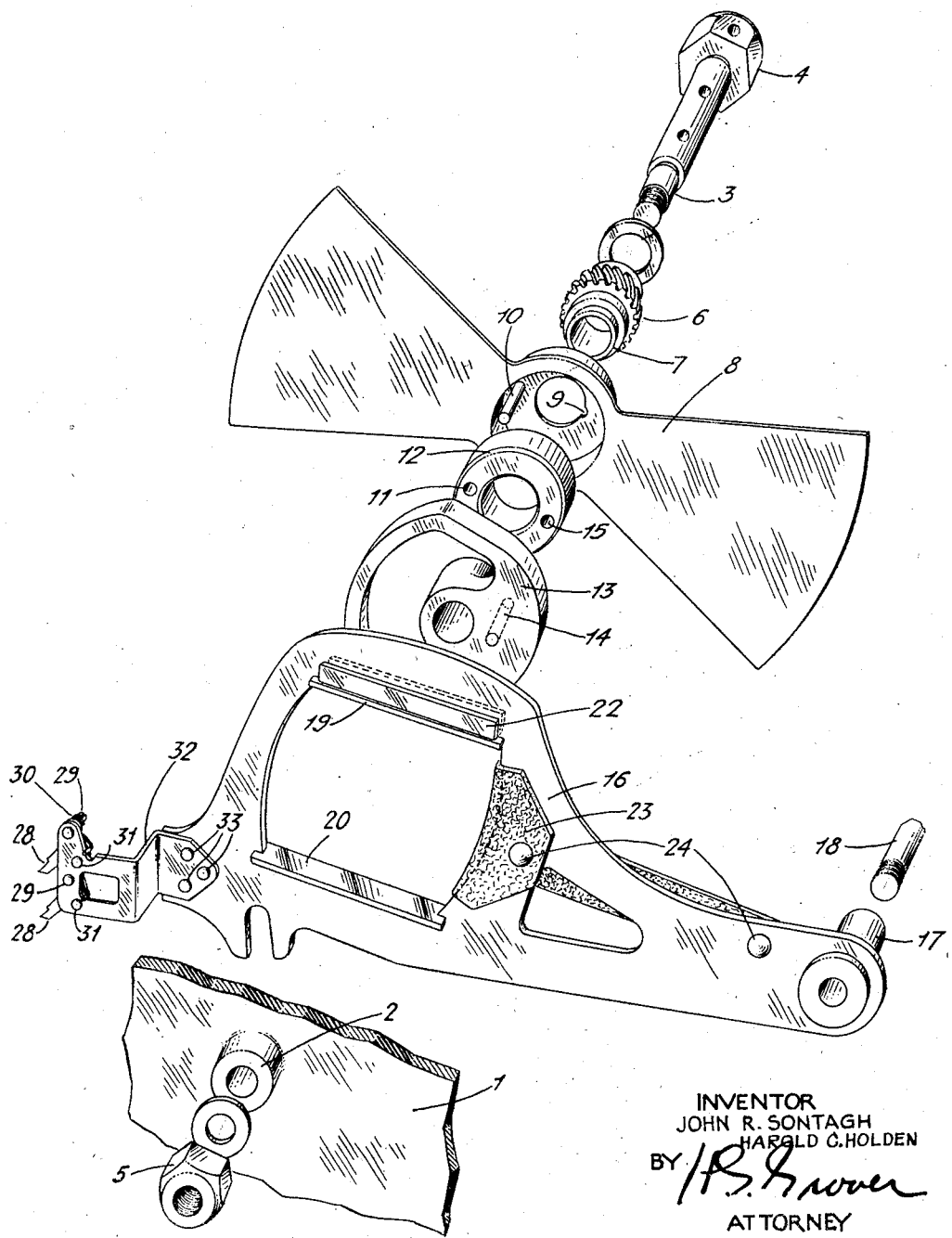
Fig. 1 is an exploded view of our improved intermittent feed mechanism.

The apparatus shown in the drawings and described hereinafter is of a type specifically designed for use in 16 mm. motion picture projectors or cameras having a single sprocket hole per picture, but it will be apparent that this does not in any way affect the scope of my invention as the mechanism can be as well used for 35 mm. or other sized films by making the various parts thereof of the proper sizes and proportions.

In Fig. 1, 1 indicates a center plate or other vertical stationary member of a motion picture projector or camera. This supporting plate is provided with an appropriate boss 2 which may be cast integral therewith and machined to proper dimensions, or which may be in the form of a bushing threaded or pressed into the center plate.

Into the orifice of this member 2 is fitted the reduced portion 3 of the shouldered screw 4, and the shoulder of the screw is pulled firmly against the opposite face of the member 2 by the nut 5, thereby providing a rigid and substantial stationary shaft upon which the rotational parts of our intermittent feed mechanism may rotate.

The mechanism is driven by any appropriate power means applying torque to the gear 6 which serves to drive the intermittent feed. The reduced portion 7 of the gear 6 fits into the central aperture of the shutter 8, and the said reduced portion is staked into the notch 9 in this aperture, thereby retaining the gear 6 and the shutter 8 together as an operative unit.

The cup-shaped central portion of the shutter 8 is provided with a driving pin 10 which fits into an aperture 11 in the collar 12 which is of rubber or other elastic material. The cam 13, of customary shape, is provided, and this cam is provided with a pin 14 extending at its rear face into co-operative relation with the hole 15 of the collar 12. It will be apparent that the collar 12 serves as a cushion between the shutter 8 and gear 6, and the cam 14, and absorbs irregularities which might be imparted to the cam 13 by the reaction of its follower, thereby preventing such irregularities from reacting upon whatever drive means are provided for gear 6.

The cam follower is generally indicated at 16 and is provided with an integral bushing 17 which provides an appropriate bearing for its oscillation about an appropriate pivot 18.

The cam follower 16 is provided with follower plates 19 and 20 which, as shown in Fig. 2, co-operate with opposite faces of the cam 13. These follower plates are preferably made of hard springy steel while the cam 13 is preferably made of a hard alloy which may be readily die-cast such, for example, as that commercially sold under the name of "brastil".

As shown at 20 in Fig. 1, the follower plates are identical in size and shape, are wider than the thickness of the member 16, and are provided with rectangular notches at each end of such width as to fit snugly over the portions of the member 16 when the follower plates are fitted into the rectangular recesses therein as indicated at 21 in Fig. 2.

These follower plates are identical with each other and the two sides of each plate are identical, and it will be apparent that either of these plates may be reversed in position when it becomes worn, or the two plates may be interchanged, so that opposite surfaces thereof become the operative surfaces. It will also be apparent that these plates are readily removed by merely removing the follower 16 from the cam, when the plates may be removed for changing them in position or for replacing them.

The upper follower plate 19 rests against a channel-shaped member 22 which likewise fits into the rectangular recess in the member 16 and extends upward on both sides of the member 16 to avoid lateral displacement thereof. This member 22 is made of rubber or similar elastic material and is of such thickness that it must be compressed somewhat in inserting the cam 13 between the follower plates 19 and 20. The member 22 therefore acts as a cushion to absorb any shocks tending to be imparted to the follower 16 by the cam 13, and also serves to take up any normal wear occurring in either the cam or the follower plates, due to its compression in ordinary operative position.

The surface of the cam 13 and the surfaces of the follower plates 19 and 20 are lubricated by means of a wick 23 which, as shown in Fig. 2, extends into yielding contact with the cam 13 during a portion of the revolution of the cam. This wick 23 is secured to the member 16 by appropriate rivets 24 and extends around the bushing 17. The bushing 17 which oscillates on the stationary shaft 18 is lubricated by any convenient means such as a wick oiler, ring oiler, or oil tubes, and a portion of the oil reaching the bushing 17 is absorbed by the wick 23 and carried thereby to the surface of the cam 13 which in turn carries the lubrication to the follower plates 19 and 20. The bushing is provided with a notch 17' through which a portion of the wick extends into contact with the shaft 18.

It will be apparent that rotation of the cam 13 by the gear 6 through the connecting means described will cause the cam follower 16 to oscillate about the shaft 18 through the proper distance to pull down the film one frame for each oscillation, and during the pull-down movement of the follower 16, the shutter 8 will be interposed between the light source and the picture gate. In this form of intermittent mechanism, the light is ordinarily located at one side of the apparatus, passing transversely through the shutter, and is then reflected to the picture aperture.

The forward end of the cam follower 16 is steadied in its vertical movements by the shouldered screw 25 which fits into a collar 26 holding this collar firmly against the boss 27 on the center plate and maintaining the head of the screw spaced from the collar 26 by a distance very slightly greater than the thickness of the member 16 as shown in Fig. 3.

The film is gripped at the outer end of the cam follower 16 by the claws 28 which are pivoted upon the screws 29 and are pressed downwardly into contact with the film by the coil springs 30. The forwardmost position of the claws 28 is determined by the stop screws 31 which co-operate with the recesses shown at the rear portion of the claws 28 to limit the movement thereof under the action of the springs 30. During an upward movement of the claws the tapered upper faces thereof cause them to be withdrawn from the sprocket holes of the film and to pass over the surface of the film, but on the downward stroke the claws enter the perforations of the film and force the film downward with them.

For convenience in construction and assembly as well as for the purpose of making the device lighter, we have preferred to mount the claws 28 on a bracket 32 which is secured to the cam follower 16 either by rivets 33 as shown, or by spot welding, as we are thereby enabled to make the bracket 32 of appreciably lighter material than that necessary for the cam follower 16, with a corresponding decrease in any tendency for the apparatus to vibrate. This bracket 32 may, however, be formed from the same sheet of material as the follower 16.

Having now described our invention, we claim:

1. Intermittent feed mechanism comprising a cam follower, a cam within an aperture of said follower for oscillating said follower, a plurality of plates fitted in recesses in said follower at opposite sides of said cam for coacting with said cam, means securing said plates against sidewise movement in said recesses whereby said plates are retained in said recesses by said cam.

2. Intermittent feed mechanism comprising a cam follower, a cam within an aperture of said follower for oscillating said follower, a plurality of plates fitted in recesses in said follower at opposite sides of said cam for coacting with said cam, means securing said plates against sidewise movement in said recesses whereby said plates are retained in said recesses by said cam, and a layer of resilient material between at least one of said plates and said follower.

3. Intermittent feed mechanism comprising a cam follower, a cam within an aperture of said follower for oscillating said follower, a plurality of plates fitted in recesses in said follower at opposite sides of said cam for coacting with said cam, means securing said plates against sidewise movement in said recesses whereby said plates are retained in said recesses by said cam, and a layer of compressed resilient material between at least one of said plates and said follower.

JOHN R. SONTAGH.
HAROLD C. HOLDEN.